United States Patent
Elton

(10) Patent No.: US 9,809,135 B2
(45) Date of Patent: Nov. 7, 2017

(54) VEHICLE SEAT WITH CABLE FORCE REDUCER

(71) Applicant: Robert Elton, Ann Arbor, MI (US)

(72) Inventor: Robert Elton, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 269 days.

(21) Appl. No.: 14/838,654

(22) Filed: Aug. 28, 2015

(65) Prior Publication Data

US 2017/0057382 A1 Mar. 2, 2017

(51) Int. Cl.
*B60N 2/44* (2006.01)
*B60N 2/235* (2006.01)

(52) U.S. Cl.
CPC ......... *B60N 2/4435* (2013.01); *B60N 2/2356* (2013.01)

(58) Field of Classification Search
CPC ............................ B60N 2/2356; B60N 2/4435
USPC .................................................... 297/378.12
See application file for complete search history.

(56) References Cited

U.S. PATENT DOCUMENTS

| 7,393,056 | B2 | 7/2008 | O'Connor | |
|---|---|---|---|---|
| 8,678,501 | B2 * | 3/2014 | Jockel | B60N 2/3013 |
| | | | | 297/378.12 |
| 8,888,186 | B2 | 11/2014 | Otsuka et al. | |
| 2001/0028189 | A1 * | 10/2001 | Klein | B60N 2/20 |
| | | | | 297/378.12 |

* cited by examiner

*Primary Examiner* — Anthony D Barfield
(74) *Attorney, Agent, or Firm* — Ralph E. Smith

(57) ABSTRACT

A vehicle seat has a seat base and movable backrest coupled to the seat base. Each side of the seat has a backrest locking mechanism. A case having a first slot is fixedly mounted to the seat. A pulley having a pulley wheel and a first pin is received in the case and translatable longitudinally in the case. The pin is received in the first slot and coupled to the pulley wheel for common translation therewith. A case attachment end of an input cable is fixedly coupled to the case and a user input end of the input cable receives an input force from a user. The input cable extends around a portion of the pulley wheel. Ends of at least two output cables are coupled to the pulley for common translation therewith and opposite ends of the output cables are coupled to respective ones of the backrest locking mechanisms.

14 Claims, 5 Drawing Sheets

VEHICLE SEAT WITH CABLE FORCE REDUCER

FIELD

The present disclosure relates to a vehicle seat with a cable force reducer for releasing backrest locking mechanisms from locked states.

BACKGROUND

This section provides background information related to the present disclosure which is not necessarily prior art.

Vehicle seats typically include a seat mechanism that locks and unlocks a back support for rotation relative to a bottom support. The seat mechanism includes a lever that can be actuated by a user to selectively lock and unlock the back support. For example, the user may pull a strap to actuate the lever and release the back support, thus allowing the user to rotate the back support relative to the bottom support. It can be desirable to reduce the amount of force needed to actuate the lever.

Additionally, some seats include two of such mechanisms that are spaced apart by a relatively large distance (e.g. one on an inboard side of the seat and one on an outboard side of the seat). It is typically necessary to actuate each mechanism simultaneously to release the back support of the seat. It can be difficult for a user to actuate both mechanisms, and the amount of force needed to actuate both mechanisms can be greater than the amount of force needed to actuate a single mechanism.

SUMMARY

This section provides a general summary of the disclosure, and is not a comprehensive disclosure of its full scope or all of its features.

In accordance with an aspect of the present disclosure, a vehicle seat includes a seat base, a movable backrest, a first backrest locking mechanism, a second backrest locking mechanism, a case, a pulley, an input cable, and at least first and second output cables. The movable backrest is coupled to the seat base. Each backrest locking mechanism has a locked state and an unlocked state. When the backrest locking mechanisms are both in the unlocked state they allow the backrest to rotate relative to the seat base and when either backrest locking mechanism is in the locked state the backrest is locked in a fixed position relative to the seat base. The case has a first slot. The case is fixedly mounted to one of the backrest and the seat base. The pulley includes a pulley wheel and a first pin. The pulley wheel is disposed within the case and translatable longitudinally in the case. The first pin is slidably received in the first slot and coupled to the pulley wheel for common translation with the pulley wheel with the first pin translating in the first slot when the pulley wheel translates in the case. The input cable has opposed ends with one end a case attachment end and the other end a user input end. The case attachment end is fixedly coupled to the case. The user input end is configured to receive an input force from a user which pulls the input cable when the input force is received. The input cable extends around a portion of the pulley wheel. The first and second output cables have opposed ends with one end a pulley attachment end and the other end a backrest locking end. The pulley attachment ends are coupled to the pulley for common translation therewith. The backrest locking end of the first output cable is operatively coupled to the first backrest locking mechanism to switch the first backrest locking mechanism from the locked state to the unlocked state. The backrest locking end of the second output cable is operatively coupled to the second backrest locking mechanism to switch the second backrest locking mechanism from the locked state to the unlocked state.

In accordance with an aspect of the present disclosure, the case includes opposed shells that are mated together. One of the shells has the first slot and the other shell has a second slot. The pulley includes a second pin that is slidably received in the second slot and coupled to the pulley wheel for common translation with the pulley wheel.

In accordance with an aspect of the present disclosure, the pulley attachment end of the first output cable is coupled to the first pin and the pulley attachment end of the second output cable is coupled to the second pin.

In accordance with an aspect of the present disclosure, the vehicle seat further includes a fastener. The case has a first aperture. The case attachment end of the input cable is fixedly coupled to the case and includes a bracket that has a second aperture. The fastener is received through the first and second apertures to fixedly couple the case attachment end of the input cable to the case.

In accordance with an aspect of the present disclosure, the fastener fixedly couples the case to the one of the backrest or the seat base.

In accordance with an aspect of the present disclosure, the case has a third aperture and a fourth aperture. The bracket includes a bracket body that has the second aperture and a pair of fingers. Each finger extends through a corresponding one of the third and fourth apertures.

In accordance with an aspect of the present disclosure, each finger includes a first portion that extends through the corresponding one of the third and fourth apertures, and a second portion that extends generally perpendicular to the first portion and opposes an external side of the case.

In accordance with an aspect of the present disclosure, the case attachment end of the input cable is fixedly coupled to the case proximate to a first side of the case and the input cable extends away from the first side, around the portion of the pulley wheel, and through the first side of the case. The output cables extend through a second side of the case that is opposite the first side.

In accordance with an aspect of the present disclosure, the case attachment end of the input cable includes a bracket that has a first aperture. The case has a protrusion received through the first aperture to fixedly couple the case attachment end of the input cable to the case.

In accordance with an aspect of the present disclosure, the vehicle seat further includes a fastener. The case has a second aperture through the protrusion. The fastener is received through the first and second apertures.

In accordance with an aspect of the present disclosure, the fastener fixedly couples the case to the one of the backrest or the seat base.

In accordance with an aspect of the present disclosure, the backrest locking mechanisms are disposed on opposite sides of the vehicle seat assembly.

In accordance with an aspect of the present disclosure, the vehicle seat includes a fastener. The case has a first aperture and the fastener is received through the first aperture. The fastener is fixedly coupled to the one of the backrest and the seat base. The case attachment end of the input cable is fixedly coupled to the fastener.

In accordance with an aspect of the present disclosure, the case attachment end of the input cable includes a bracket that has a second aperture. The fastener is received through the first and second apertures to fixedly couple the case attachment end of the input cable to the one of the backrest and the seat base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

In accordance with an aspect of the present disclosure, a vehicle seat assembly has a seat base and a movable backrest coupled to the seat base. The vehicle seat assembly includes at least a pair of back rest locking mechanisms and a lock release mechanism including a cable force reducer. Each back rest locking mechanism has a locked state and an unlocked state. The backrest locking mechanism, when in the unlocked state, allows the backrest to rotate relative to the seat base and, when in the locked state, locks the backrest in a fixed position relative to the seat base. The cable force reducer is coupled to the backrest locking mechanisms to release the back rest locking mechanisms from the locked state to the unlocked state in response to a single input force. The single input force can be less than the total amount of force that would otherwise be necessary to actuate the back rest locking mechanisms if applied directly to the backrest locking mechanisms.

Figure 1:
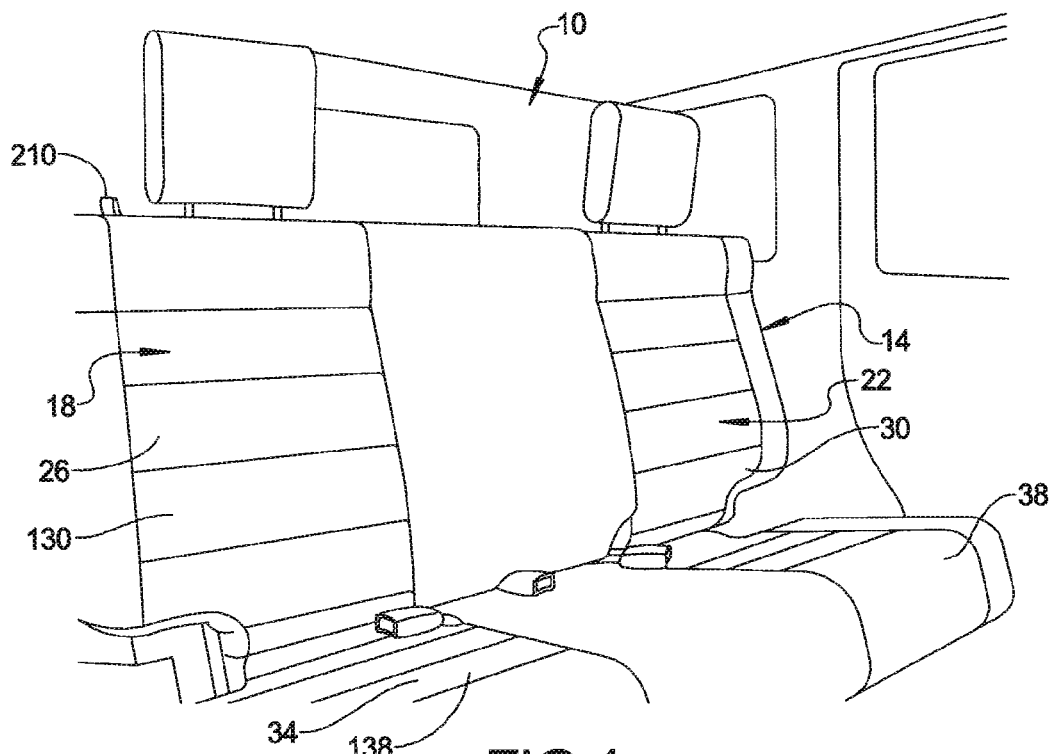
FIG. 1 is a perspective view of a set of vehicle seats in accordance with the present teachings.

With reference to FIG. 1, a portion of a vehicle passenger compartment 10 and a set of vehicle seats 14 are illustrated. In the example provided, the set of seats 14 is located in the rear of the passenger compartment 10 and is a bench style seat, though other configurations can be used. In the example provided the set of seats 14 includes a first seat 18 and a second seat 22, in a configuration known as a 60/40 split, though other configurations can be used. In this configuration, the first seat 18 makes up approximately 60% of the total length of the set of seats 14 and the second seat makes up approximately 40% of the total length. The first and second seats 18, 22 each have a respective backrest 26, 30 and a respective seat base 34, 38. In an alternative construction, not specifically shown, the first and second seats 18, 22 share a single seat base that extends the full length of the set of seats 14. The seat base 34, 38 is configured to support an occupant vertically above the floor of the passenger compartment 10. The backrest 26, 30 is configured to support the occupant's back when sitting on the seat base 34, 38.

Figure 2:
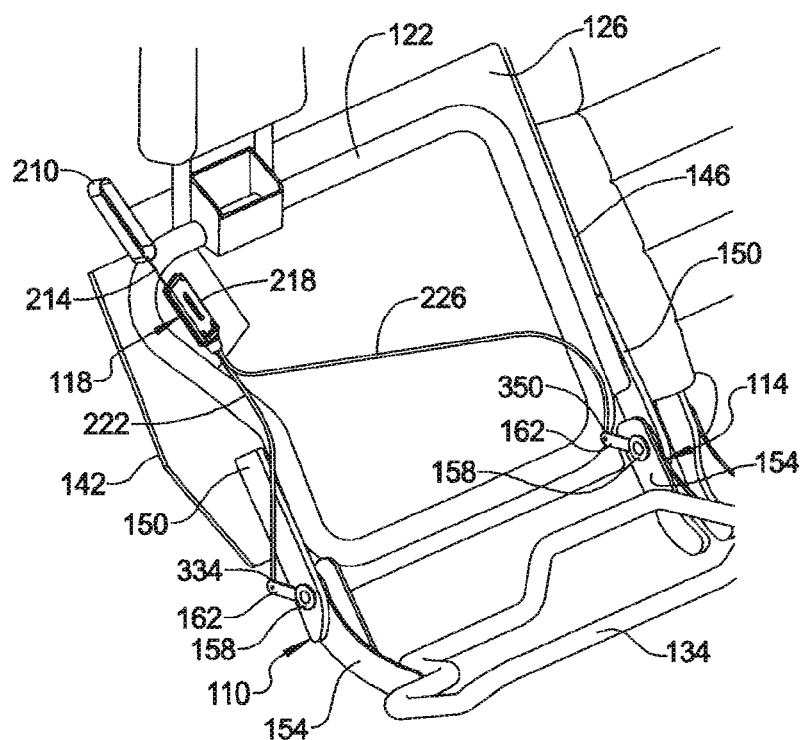
FIG. 2 is a perspective view of a portion of the vehicle seats of FIG. 1, illustrating a seat frame, a seat mechanism, and an input device including a cable force reducer in accordance with the present disclosure.

With additional reference to FIG. 2, the first seat 18 includes the backrest 26, the seat base 34, a first seat mechanism 110, a second seat mechanism 114, and a lock release mechanism 118. The second seat 22 can be constructed similarly to the first seat 18. Thus, only the first seat 18 will be described in detail herein. The backrest 26 includes a backrest frame 122, a back plate 126, and a back cushion 130 (FIG. 1). The backrest frame 122 is a generally tubular structure formed of a rigid material, such as steel, though other configurations can be used. The back plate 126 is a generally rigid, plate-like structure fixedly mounted to the rear of the backrest frame 122. The back cushion 130 is formed of a generally resilient material (e.g. foam covered in fabric or leather) and is fixedly mounted to the backrest frame 122 and/or the back plate 126 to provide support to an occupant's back when the occupant is sitting in the first seat 18. When fully assembled, the backrest frame 122 is generally hidden between the back cushion 130 and the back plate 126.

The seat base 34 includes a bottom frame 134 and a bottom cushion 138 (FIG. 1). The bottom frame 134 is a generally tubular structure formed of a rigid material, such as steel, though other configurations can be used. The bottom frame 134 is mounted to a floor of the passenger compartment 10. The bottom cushion 138 is formed of a generally resilient material (e.g. foam covered in fabric or leather) and is fixedly mounted to the bottom frame 134 to support the occupant vertically above the floor of the passenger compartment 10 when the occupant is sitting in the first seat 18. When fully assembled, the bottom frame 134 is generally hidden within or below the bottom cushion 138.

The first and second seat mechanisms 110, 114 couple the backrest frame 122 to the bottom frame 134 in any suitable manner. In the example provided, the first and second seat mechanisms 110, 114 are disposed on opposite sides of the seat 18 with the first seat mechanism 110 located proximate to an outboard side 142 of the first seat 18 and the second seat mechanism 114 spaced apart from the first seat mechanism 110 and located proximate to an inboard side 146 of the first seat 18. The first and second seat mechanisms 110, 114 each include a first member 150, a second member 154, a back rest locking mechanism 158, and a lever 162. The first member 150 is fixedly coupled to the backrest frame 122. The second member 154 is fixedly coupled to the bottom frame 134. The backrest locking mechanism 158 couples the first member 150 to the second member 154 and is selectively operable in a locked state and an unlocked state.

When the backrest locking mechanism 158 is in the locked state, the first and second members 150, 154 are locked in fixed positions relative to each other such that the position of the backrest frame 122 relative to the bottom frame 134 is fixed. When the backrest locking mechanism 158 is in the unlocked state, the backrest frame 122 can be rotated relative to the bottom frame 134. In the example provided, both locks 158 must be in their unlocked states to permit the backrest frame 122 to rotate relative to the bottom frame 134. For example, when both locks 158 are in the unlocked state, the backrest 26 can be rotated forward to permit access to an area of the passenger compartment 10 behind the first seat 18.

Each lever 162 can be coupled to one of the locks 158 such that actuation of the lever 162 can switch the corresponding backrest locking mechanism 158 between the locked and unlocked states. A spring (not specifically shown) can be coupled to the lever 162 or backrest locking mechanism 158 to bias the backrest locking mechanism 158 toward being in the locked state.

Figure 3:
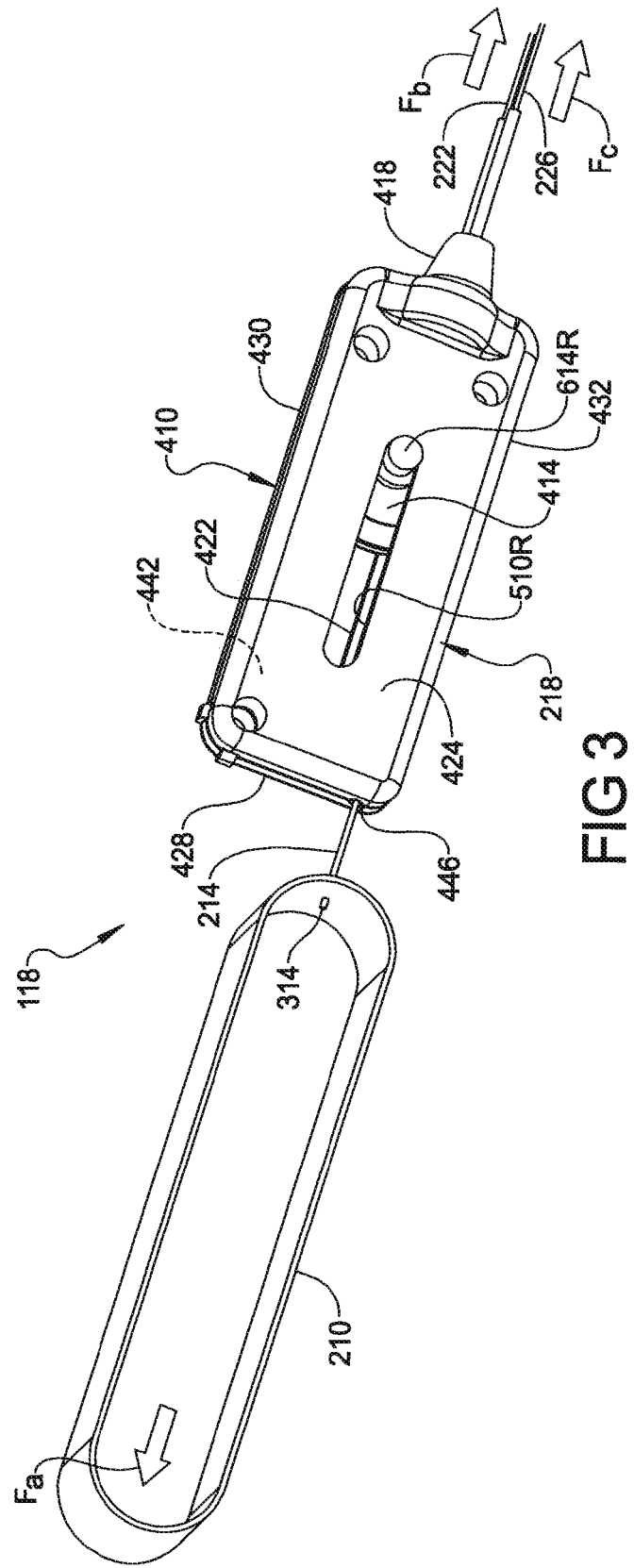
FIG. 3 is a perspective view of the cable force reducer of FIG. 2.

With additional reference to FIG. 3, the lock release mechanism 118 is described in greater detail. The lock release mechanism 118 is configured to permit a user to actuate the levers 162. In the example provided, the lock release mechanism 118 includes a single pull strap 210, an input cable 214, a cable force reducer 218, a first output cable 222, and a second output cable 226. In an aspect of the present disclosure, the pull strap 210 has a shape that is easily gripped by a user. In the example provided, the pull strap 210 is a flexible fabric material formed into a loop that is large enough for the user to fit his/her finger(s) and/or hand into the loop, though other configurations can be used.

As best shown in FIGS. 1 and 2, the pull strap 210 extends partially within the back support 26 and partially out of the back support 26. In the example provided, the pull strap extends through an opening in the back cushion 130, though other configurations can be used. It should be understood that pull strap 210 can have other configurations and can be made of other materials.

Figure 4:
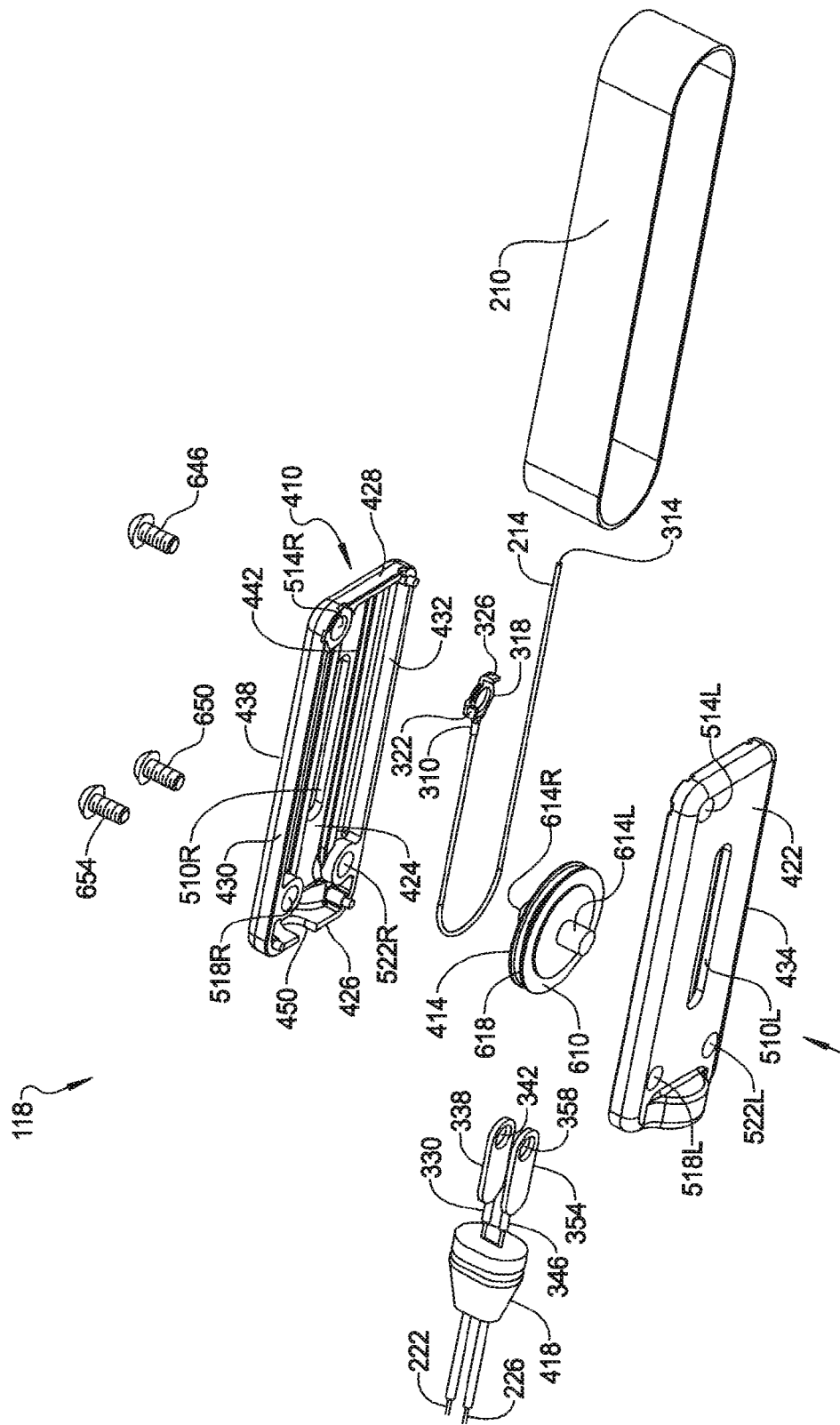
FIG. 4 is an exploded view of the cable force reducer of FIG. 2.

With additional reference to FIG. 4, the input cable 214 is any suitable type of cable, such as a metal or fabric wire for example. The input cable 214 has opposed ends with one end being referred to as a case attachment end 310 and the other end being referred to as user input end 314. In the example provided, the case attachment end 310 includes an annular shaped bracket 318, and a pair of fingers 322, 326 which can be formed of a rigid material. One end of each of the fingers 322, 326 is fixedly coupled to the annular shaped bracket 318 and the fingers 322, 326 extend generally radially outward from the annular shaped bracket 318. In the example provided, the fingers 322, 326 are circumferentially spaced about the annular shaped bracket 318 by approximately 90°. The other end of each of the fingers 322, 326 is free and bent at approximately 90° relative to the end that is coupled to the annular shaped bracket 318. The annular shaped bracket 318 and fingers 322, 326 fixedly couple the input cable 214 to the cable force reducer 218 as described below. The user input end 314 is fixedly coupled to the pull strap 210 in any suitable manner, such as being sewn to the pull strap 210 for example.

The output cables 222, 226 are any suitable type of cable, such as a metal or fabric wire for example. The first output cable 222 has opposed ends with one end being referred to as pulley attachment end 330 and the other end being referred to as backrest locking end 334 (FIG. 2). In the example provided, pulley attachment end 330 includes a first output mount 338 which is formed of a rigid material and includes a first mount aperture 342. The first output mount 338 is coupled to the cable force reducer 218 as described below. The backrest locking end 334 (FIG. 2) is coupled to one of the levers 162 (e.g. the lever 162 located at the outboard side 142 of the first seat 18 as shown in FIG. 2).

The second output cable 226 has opposed ends with one end being referred to as pulley attachment end 346 and the other end being referred to as backrest locking end 350 (FIG. 2). In the example provided, the pulley attachment end 346 includes a second output mount 354 which is formed of a rigid material and has a second mount aperture 358. The second output mount 354 is coupled to the cable force reducer 218 as described below. The backrest locking end 350 (FIG. 2) is coupled to the other one of the levers 162 (e.g. the lever 162 located at the inboard side 146 of the first seat 18 as shown in FIG. 2).

With continued reference to FIG. 4, the cable force reducer 218 includes a case 410, a pulley 414, and a guide body 418. The case 410 has a generally rectangular geometry having first through sixth walls that will be referred to herein as a left wall 422, a right wall 424, a front wall 426, a rear wall 428, a top wall 430, and a bottom wall 432. It is understood that the terms left, right, front, rear, top, and bottom used herein are not intended to correlate to or limit the orientation of the case 410 within the passenger compartment 10. The case 410 extends longitudinally between the front and rear walls 426, 428.

In the example provided, the case 410 includes a left shell 434 and a right shell 438 that generally form opposite halves of the case 410 split along a plane that traverses the front, rear, top, and bottom walls 426, 428, 430, 432 and is parallel to the left and right walls 422, 424. The left and right shells 434, 438 define an inner cavity 442 within the case 410. The left and right shells 434, 438 are formed of a rigid material (e.g. rigid plastic, or metal). The left and right shells 434, 438 can be fixedly joined together by any suitable means, such as welding, adhesive, or fasteners for example.

Figure 5:
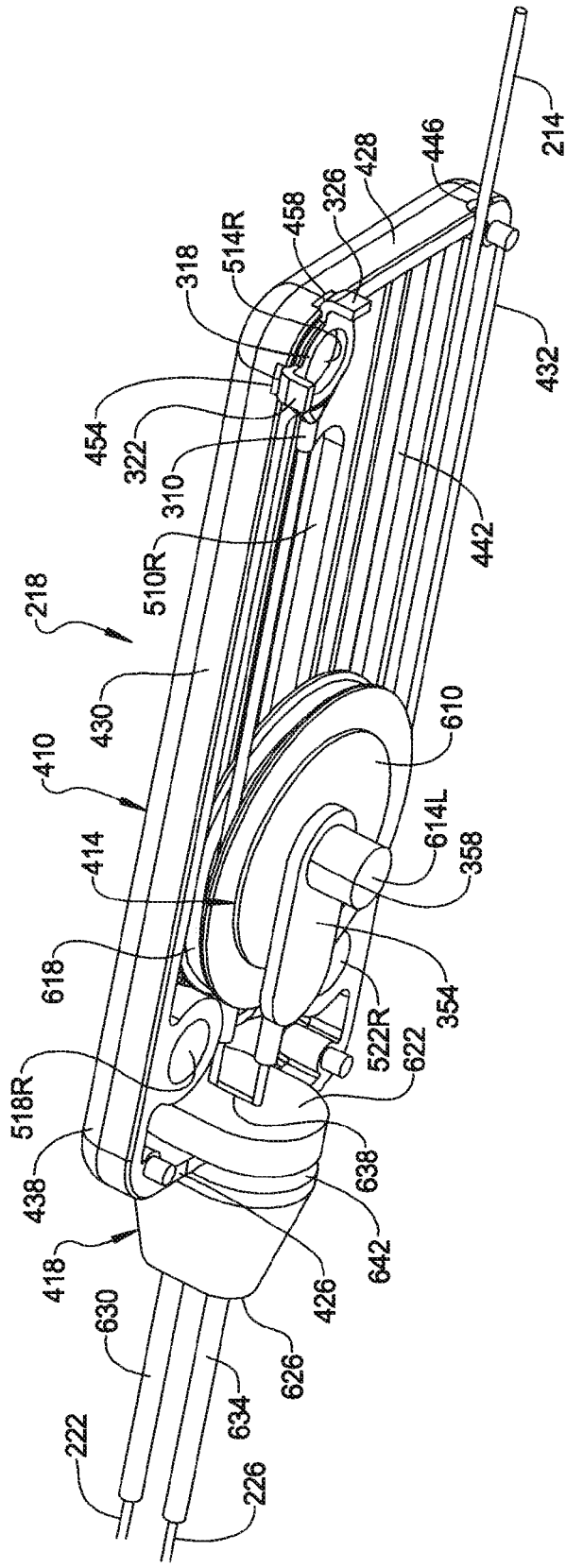
FIG. 5 is a perspective view of a portion of the cable force reducer of FIG. 2.

With additional reference to FIG. 5, in the example provided, the left and right shells 434, 438 cooperate to define an input aperture 446, a guide aperture 450 (FIG. 4), and a pair of finger apertures 454, 458. The input aperture 446 extends through the rear wall 428 of the case 410, and in the example provided, is located generally near a corner of the case 410 that is formed by the bottom wall 432 and the rear wall 428. The guide aperture 450 (FIG. 4) extends through the front wall 426 of the case 410, and in the example provided, is located generally near a center of the front wall 426. In the example provided, the finger aperture 454 extends through the top wall 430 near a corner of the case 410 that is formed by the top wall 430 and the rear wall 428, and the finger aperture 458 extends through the rear wall 428 near the same corner of the case 410 as the finger aperture 454.

The right shell 438 has a right slot 510R, a first right aperture 514R, a second right aperture 518R, and a third right aperture 522R. The right slot 510R is formed in the right wall 424 of the case 410. The right slot 510R extends longitudinally generally between the front and rear walls 426, 428 of the case 410. In the example provided, the right slot 510R extends through the right wall 424 such that the right slot 510R is open to the cavity 442 and the exterior of the case 410, though other configurations can be used. For example, the right slot 510R can extend only partially through the right wall 424 such that the right slot 510R is open only to the cavity 442.

The first, second, and third right apertures 514R, 518R, 522R extend through the right wall 424 of the case 410. While the example shown has three apertures, more or fewer apertures can be used. The first right aperture 514R is located generally at a corner of the case 410 that is formed by the rear wall 428 and the top wall 430. The second right aperture 518R is located near a corner of the case 410 that is formed by the front wall 426 and the top wall 430. The third right aperture 522R is located near a corner of the case 410 that is formed by the front wall 426 and the bottom wall 432.

Returning to FIG. 4, the left shell 434 is similar and generally complementary (e.g. a mirror image) of the right shell 438. The left shell 434 has a left slot 510L similar to the right slot 510R, and first through third left apertures 514L, 518L, 522L similar to the first through third right apertures 514R, 518R, 522R. The left slot 510L is formed in the left wall 422 of the case 410. The left slot 510L extends longitudinally generally between the front and rear walls 426, 428 of the case 410. In the example provided, the left slot 510L extends through the left wall 422 such that the left slot 510L is open to the cavity 442 and the exterior of the case 410, though other configurations can be used. For example, the left slot 510L can extend only partially through the left wall 422 such that the left slot 510L is open only to the cavity 442.

The first, second, and third left apertures 514L, 518L, 522L extend through the left wall 422 of the case 410. While the example shown has three apertures, more or fewer apertures can be used to correspond to the number of apertures in the right shell 438. The first left aperture 514L is located generally at a corner of the case 410 that is formed by the rear wall 428 and the top wall 430 and aligns with the first right aperture 514R when the left and right shells 434, 438 are mated. The second left aperture 518L is located near a corner of the case 410 that is formed by the front wall 426 and the top wall 430 and aligns with the second right aperture 518R when the left and right shells 434, 438 are mated. The third left aperture 522L is located near a corner of the case 410 that is formed by the front wall 426 and the bottom wall 432 and aligns with the third right aperture 522R when the left and right shells 434, 438 are mated.

As best seen in FIGS. 4 and 5, the pulley 414 includes a pulley wheel 610, a right pin 614R, and a left pin 614L. The pulley wheel 610 is disposed within the cavity 442 and has a round shape including a groove 618 disposed about the circumference of the pulley wheel 610. In the example provided, the left and right pins 614L, 614R are fixedly coupled to the pulley wheel 610 and extend outward from opposite sides of the pulley wheel 610. The left and right pins 614L, 614R are generally cylindrical in shape and coaxial with the pulley wheel 610. The left pin 614L is received in the left slot 510L. The left pin 614L has a diameter that is similar to but slightly less than the width of the left slot 510L, such that the left pin 614L is free to slide along the longitudinal length of the left slot 510L. The right pin 614R is received in the right slot 510R. The right pin 614R has a diameter that is similar to but slightly less than the width of the right slot 510R, such that the right pin 614R is free to slide along the longitudinal length of the right slot 510R. The left and right pins 614L, 614R are generally cylindrical in shape such that the left and right pins 614L, 614R and the pulley wheel 610 are free to rotate about the axis of the pulley wheel 610 relative to the case 410.

In an alternative construction, not specifically shown, the pulley wheel 610 can have a central aperture and a singular pin can extend through the central aperture. In such a construction, the pulley wheel 610 can be coupled to the singular pin for common translation along the longitudinal length of the left and right slots 510L, 510R and can be configured to rotate relative to the singular pin.

With specific reference to FIG. 5, the guide body 418 is formed of a resilient material, such as rubber or a resilient polymer for example. In the example provided, the guide body 418 is a generally conical shaped body having a base 622, and a nose 626. The guide body 418 can also include a pair of sleeves 630, 634. The guide body 418 defines a central channel 638 that is open at the base 622 and extends longitudinally toward the nose 626. In an alternative construction, not specifically shown, the guide body 418 defines a pair of channels that are open at the base 622 and extend longitudinally toward the nose 626. The sleeves 630, 634 are fixedly coupled to the nose 626 and are generally hollow cylinders that are open on both sides with one side being open to the central channel 638.

The guide body 418 also defines a groove 642 that extends about the outer perimeter of the guide body 418. The groove 642 is configured to receive the portion of the front wall 426 that defines the guide aperture 450 to fixedly couple the guide body 418 to the case 410. When the portion of the front wall 426 is received in the groove 642, the base 622 is located within the cavity 442 and the nose 626 is located external of the case 410.

Figure 6:
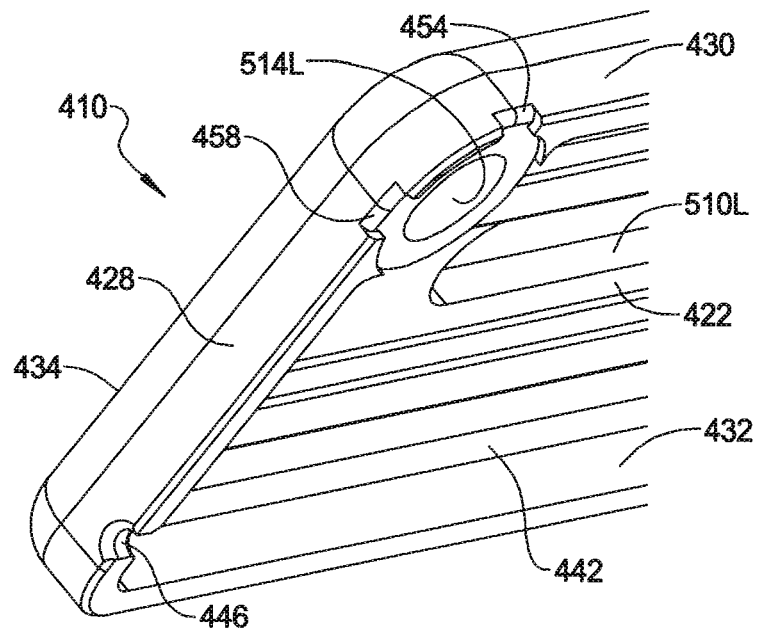
FIG. 6 is a perspective view of a portion of a case of the cable force reducer of FIG. 2.

With reference to FIGS. 5 and 6, the input cable 214 extends through the input aperture 446 on the rear wall 428 and is received in the groove 618 of the pulley wheel 610. The input cable 214 wraps around a portion of the pulley wheel 610 (e.g. approximately half of the circumference of the pulley wheel 610) and returns back toward the rear wall 428. The annular shaped bracket 318 is positioned to be generally coaxial with the first left and right apertures 514L, 514R such that the central aperture of the annular shaped bracket 318 aligns with the first left and right apertures 514L, 514R. The finger 322 is received through the finger aperture 454 and the finger 326 is received through the finger aperture 458. The free end of the finger 322 is configured to oppose the exterior of the top wall 430 to prevent the case attachment end 310 of the input cable 214 from moving toward the bottom wall 432. The free end of the finger 326 is configured to oppose the exterior of the rear wall 428 to prevent the case attachment end 310 of the input cable 214 from moving toward the front wall 426.

In the example provided, a first fastener 646 (FIG. 4) is received through the first left aperture 514L, the first right aperture 514R, and the central aperture of the annular shaped bracket 318 to fixedly couple the annular shaped bracket 318 to the case 410. The first fastener 646 can also fixedly couple the left and right shells 434, 438 together. The first fastener 646 can be any suitable type of fastener, such as a rivet, screw, or bolt for example. In the example provided, the first fastener 646 also fixedly couples the case 410 to the backrest frame 122 (as shown in FIG. 2). Since the first fastener 646 is received through the central aperture of the annular shaped bracket 318 and is fixedly coupled to the backrest frame 122, the first fastener 646 fixedly couples the case attachment end 310 of the input cable 214 to the backrest frame 122.

Figure 7:
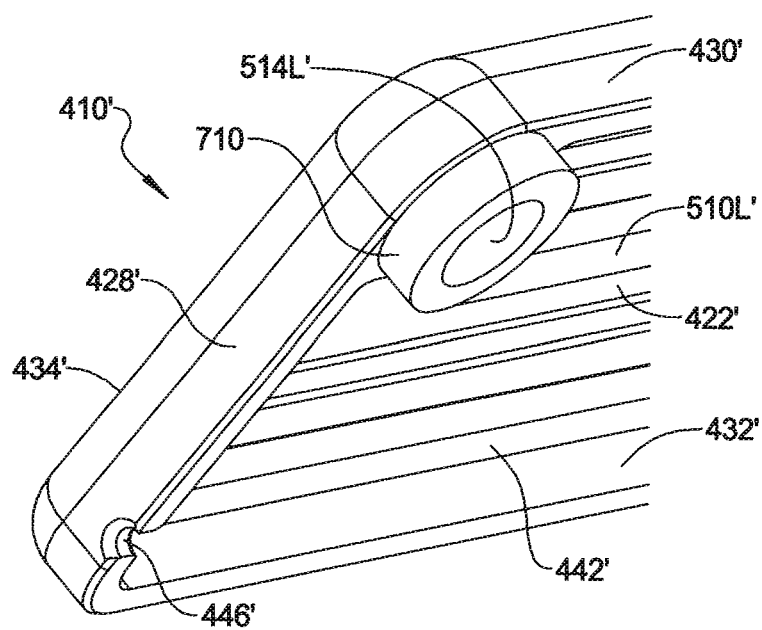
FIG. 7 is a perspective view of a portion of a case of a cable force reducer of a second construction.

With reference to FIG. 7, an alternative construction of a case 410' is shown. The case 410' is similar to the case 410 (FIGS. 3-6) except as otherwise shown or described herein. Accordingly, primed reference numerals represent similar features to similar, non-prime numbers. In the example provided, the left and right shells 434', 438' do not have the finger apertures 454, 458 (FIG. 6). The right shell 438' has a mount protrusion 710 that is disposed about the first right aperture 514R' and extends toward the left wall 422' (not specifically shown in FIG. 7). In the example provided, the mount protrusion 710 is a cylindrical shape and the first right aperture 514' extends coaxially through the mount protrusion 710. While not specifically shown, the left shell 434 includes a mating face or bore that opposes and receives the mount protrusion 710. The mount protrusion 710 is received coaxially through the annular shaped bracket 318 (FIGS. 3-5) to fixedly couple the case attachment end 310 (FIGS. 3-5) of the input cable 214 (FIGS. 3-5) to the case 410'.

Returning to FIGS. 4 and 5, a second fastener 650 (FIG. 4), similar to the first fastener 646 (FIG. 4), is received through the second left aperture 518L and the second right aperture 518R. The second fastener 650 (FIG. 4) fixedly couples the left and right shells 434, 438 together and fixedly couples the case 410 to the backrest frame 122. A third fastener 654 (FIG. 4), similar to the first and second fasteners 646, 650 (FIG. 4), is received through the third left aperture 522L and the third right aperture 522R. The third fastener 654 (FIG. 4) fixedly couples the left and right shells 434, 438 together and fixedly couples the case 410 to the backrest frame 122.

The first output cable 222 extends through the sleeve 630 and the central channel 638 of the guide body 418, into the cavity 442. The left pin 614L is received through the first mount aperture 342 to couple the first output mount 338 to the pulley 414 for common translation along the longitudinal length of the slots 510L, 510R, while permitting the pulley 414 to rotate relative to the first output mount 338.

The second output cable 226 extends through the sleeve 634 and the central channel 638 of the guide body 418, into the cavity 442. The right pin 614R is received through the second mount aperture 358 to couple the second output mount 354 to the pulley 414 for common translation along the longitudinal length of the slots 510L, 510R, while permitting the pulley 414 to rotate relative to the second output mount 354.

In operation, the user switches both of the locking mechanism 158 from the locked state to the unlocked state by applying a single input force Fa (shown in FIG. 3) to the pull strap 210. Since the case attachment end 310 of the input cable 214 is fixed to the case 410, which is fixed to the backrest frame 122, the total force on the pulley in the direction generally corresponding to Fa is two times Fa (i.e. 2*Fa). Additionally, since the first fastener 646 (FIG. 4) is received through the central aperture of the annular shaped bracket 318 and is fixedly coupled to the backrest frame 122 (FIG. 2), the reaction force from the input cable 214 is transferred from the case attachment end 310, through the first fastener 646, directly to the backrest frame 122 (FIG. 2), without being transferred through the case 410. Thus, the case 410 can be formed of a lighter construction or material (e.g. plastic).

The force needed to actuate the levers 162 to switch the locking mechanisms 158 to the unlocked state is represented by Fb and Fc respectively (shown in FIG. 3). Thus, the pulley 414 can translate longitudinally in case 410 with pins 614R, 614L sliding along the length of the slots 510L, 510R to pull both output cables 222, 226 and actuate the levers 162 when 2*Fa is equal to the sum of Fb and Fc (i.e. 2*Fa=Fb+Fc). In the example provided, the force needed to actuate each of the levers 162 is equal. Thus, to actuate both levers 162 to release both backrest locking mechanisms 158 from their locked state to their unlocked state, the user need only pull the pull strap 210 with a force that is equal to that needed for a single one of the levers 162 (i.e. Fa=Fb).

Since the output cables 222, 226 are flexible and translated simultaneously, the seat mechanisms 110, 114 can be spaced apart on opposite sides of the first seat 18, and the output cables 222, 226 can be routed through the backrest 26 between the cable force reducer 218 and the seat mechanisms 110, 114 in any suitable path. Thus, a user can unlock two separate seat mechanisms 110, 114 by puffing a pull strap 210 at a single location on the first seat 18 and with less force than would otherwise be needed to actuate both seat mechanisms 110, 114 directly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle seat comprising:
a seat base;
a movable backrest coupled to the seat base;
the vehicle seat having at least first and second backrest locking mechanisms, each backrest locking mechanism having a locked state and an unlocked state, the backrest locking mechanisms when both are in the unlocked state allowing the backrest to rotate relative to the seat base and when either backrest locking mechanism is in the locked state locking the backrest in a fixed position relative to the seat base;
a case having a first slot, the case fixedly mounted to one of the backrest and the seat base;
a pulley including a pulley wheel and a first pin, the pulley wheel disposed within the case and translatable longitudinally in the case, the first pin slidably received in the first slot and coupled to the pulley wheel for common translation with the pulley wheel with the first pin translating in the slot when the pulley wheel translates in the case;
an input cable having opposed ends, with one end a case attachment end that is fixedly coupled to the case and the other end a user input end that is configured to receive an input force from a user which pulls the input cable when the input force is received, the input cable extending around a portion of the pulley wheel; and
at least first and second output cables, each output cable having opposed ends with one end a pulley attachment end and the other end a backrest locking end, the pulley attachment end of each output cable is coupled to the pulley for common translation with the pulley, the backrest locking end of one of the output cables is coupled to one of the backrest locking mechanisms and the backrest locking end of the other output cable is coupled to the other backrest locking mechanism;
wherein the pulley and pulley attachment ends of the output cables translate longitudinally in the case in response to being pulled by the input cable when the input cable is pulled with the output cables pulling upon the backrest locking mechanisms to release the backrest locking mechanisms from their locked state to their unlocked state.

2. The vehicle seat of claim 1, wherein the case includes opposed shells that are mated together, one of the shells having the first slot and the other shell having a second slot, wherein the pulley includes a second pin that is slidably received in the second slot and coupled to the pulley wheel for common translation with the pulley wheel.

3. The vehicle seat of claim 2, wherein the pulley attachment end of one of the output cables is coupled to the first pin and the pulley attachment end of the other output cable is coupled to the second pin.

4. The vehicle seat of claim 1, further comprising a fastener, wherein the case has a first aperture, wherein the case attachment end of the input cable is fixedly coupled to the case and includes a bracket that has a second aperture, the fastener being received through the first and second apertures to fixedly couple the case attachment end of the input cable to the case.

5. The vehicle seat of claim 4, wherein the fastener fixedly couples the case to the one of the backrest or the seat base.

6. The vehicle seat of claim 4, wherein the case has a third aperture and a fourth aperture, wherein the bracket includes a bracket body that has the second aperture and a pair of fingers, each finger extending through a corresponding one of the third and fourth apertures.

7. The vehicle seat of claim 6, wherein each finger includes a first portion that extends through the corresponding one of the third and fourth apertures, and a second portion that extends generally perpendicular to the first portion and opposes an external side of the case.

8. The vehicle seat of claim 1, wherein the case attachment end of the input cable is fixedly coupled to the case proximate to a first side of the case and the input cable extends away from the first side, around the portion of the pulley wheel, and through the first side of the case, wherein the output cables extend through a second side of the case that is opposite the first side.

9. The vehicle seat of claim 1, wherein the case attachment end of the input cable includes a bracket that has a first aperture, wherein the case has a protrusion received through the first aperture to fixedly couple the case attachment end of the input cable to the case.

10. The vehicle seat of claim 9, further comprising a fastener, wherein the case has a second aperture through the protrusion, wherein the fastener is received through the first and second apertures.

11. The vehicle seat of claim 10, wherein the fastener fixedly couples the case to the one of the backrest and the seat base.

12. The vehicle seat of claim 1 wherein the backrest locking mechanisms are disposed on opposite sides of the vehicle seat assembly.

13. The vehicle seat of claim 1, further comprising a fastener, wherein the case has a first aperture, the fastener being received through the first aperture and being fixedly coupled to the one of the backrest and the seat base, wherein the case attachment end of the input cable is fixedly coupled to the fastener.

14. The vehicle seat of claim 13, wherein the case attachment end of the input cable includes a bracket that has a second aperture, the fastener being received through the first and second apertures to fixedly couple the case attachment end of the input cable to the one of the backrest and the seat base.

* * * * *